United States Patent
Codilian et al.

(10) Patent No.: US 6,892,249 B1
(45) Date of Patent: May 10, 2005

(54) DEPENDENTLY ADJUSTING AT LEAST THREE OPERATING LEVELS OF A DISK DRIVE BY DEPENDENTLY ADJUSTING A PLURALITY OF DISK DRIVE PARAMETERS

(75) Inventors: Raffi Codilian, Irvine, CA (US); Jonathan L. Hanmann, Corona, CA (US)

(73) Assignee: Western Digital Technologies, Inc., Lake Forest ( * ) Notice: Subject to any disclaimer, the term of this patent is extended or adjusted under 35 U.S.C. 154(b) by 297 days.

(21) Appl. No.: 10/138,070

(22) Filed: May 2, 2002

(51) Int. Cl.[7] .......................... G06F 3/00; G06F 12/00; H04N 5/91
(52) U.S. Cl. ................. 710/5; 710/8; 711/15; 711/100; 711/111
(58) Field of Search .................. 710/5, 8; 711/100, 711/111, 15, 156

(56) References Cited

U.S. PATENT DOCUMENTS

| | | | |
|---|---|---|---|
| 5,930,358 A | 7/1999 | Rao | |
| 6,169,382 B1 * | 1/2001 | McKenzie et al. | 318/561 |
| 6,195,732 B1 * | 2/2001 | Adams et al. | 711/156 |
| 6,314,473 B1 | 11/2001 | Singer et al. | |
| 6,578,106 B1 * | 6/2003 | Price | 711/111 |
| 6,757,481 B1 * | 6/2004 | Nazarian et al. | 386/69 |

* cited by examiner

Primary Examiner—Tammara Peyton
(74) Attorney, Agent, or Firm—Milad G. Shara, Esq.; Howard H. Sheerin, Esq.

(57) ABSTRACT

A computer program embodied on a computer readable storage medium is disclosed for dependently adjusting at least three operating levels of a disk drive by dependently adjusting a plurality of disk drive parameters. The computer program receives control input from one or more sources, such as an end user, an environmental sensor, or the disk drive, wherein the control input for adjusting at least three operating levels of the disk drive in a dependent manner. In response to the control input, the computer program adjusts a plurality of parameter settings in the disk drive in a dependent manner. In one embodiment, the operating levels dependently adjusted by the control input comprise a performance level, a capacity level and a robustness level.

22 Claims, 7 Drawing Sheets

DEPENDENTLY ADJUSTING AT LEAST THREE OPERATING LEVELS OF A DISK DRIVE BY DEPENDENTLY ADJUSTING A PLURALITY OF DISK DRIVE PARAMETERS

BACKGROUND OF THE INVENTION

1. Field of the Invention

The present invention relates to disk drives for computer systems. More particularly, the present invention relates to a computer program for dependently adjusting at least three operating levels of a disk drive by dependently adjusting a plurality of disk drive parameters.

2. Description of the Prior Art

The prior art has suggested to adjust various parameters in a disk drive as part of an optimization process. For example, PCT Patent Application No. WO 99/45535 discloses a method for adjusting a noise operating level and a power operating level in order to optimize a seek time parameter. However, adjusting only the noise and power operating levels by adjusting a seek time parameter restricts optimization of drive operations. U.S. Pat. No. 5,930,358 discloses a utility program executed on a host computer for adjusting various parameters of a disk drive, including error management, cache management, encryption, compression, and spin-down delay. An end user adjusts each parameter individually and independently through the utility program in order to configure the disk drive into a desired operating mode. However, independently adjusting each parameter limits the level of abstraction creating a burden on less sophisticated end users.

There is, therefore, a need to enhance the ability to configure the operating levels of a disk drive by providing a more flexible, intuitive and abstract parameter optimization process.

SUMMARY OF THE INVENTION

The present invention may be regarded as a computer program embodied on a computer readable storage medium, the computer program for dependently adjusting a plurality of parameter settings in a disk drive. The computer program receives control input for adjusting at least three operating levels of the disk drive in a dependent manner. In response to the control input, the computer program adjusts the plurality of parameter settings in a dependent manner.

In one embodiment, the computer readable storage medium is embodied in a host computer connected to the disk drive. In an alternative embodiment, the disk drive comprises the computer readable storage medium for storing the computer program.

In one embodiment, the control input comprises user input. In another embodiment, the control input comprises sensor input generated by an environmental sensor, such as an acoustic or vibration sensor. In yet another embodiment, the control input comprises operating information identifying an operating condition of the disk drive.

In one embodiment, the computer program further comprises code segments for displaying a controller for positioning a slider in a N-dimensional space, wherein N is greater than two and the slider location represents N operating levels. When the slider is moved in the N-dimensional space, the N operating levels and the plurality of parameter settings are adjusted in a dependent manner to generate a plurality of modified parameter settings. In one embodiment, the plurality of modified parameter settings are transmitted to the disk drive. In one embodiment, a current plurality of parameter settings are read from the disk drive, and the slider is displayed in the N-dimensional space using the current plurality of parameter settings.

In one embodiment, the computer program further comprises code segments for displaying N sliders for dependently adjusting N operating levels. The N operating levels and the plurality of parameter settings are dependently adjusted when any one of the sliders is adjusted to generate a plurality of modified parameter settings. In one embodiment, the computer program further comprises code segments for displaying N sliders for weighting the N operating levels, wherein each slider value assigns a weight value representing a relative importance level to each operating level. The N operating levels and the plurality of parameter settings are dependently adjusted relative to the weight values assigned to each operating level when any one of the sliders is adjusted to generate a plurality of modified parameter settings.

In one embodiment, the operating levels dependently adjusted by the control input comprise a capacity level, a robustness level, and a performance level. Adjusting the parameter settings to increase the capacity level decreases the robustness level and decreases the performance level. Adjusting the parameter settings to increase the robustness level decreases the capacity level and decreases the performance level. Adjusting the parameter settings to increase the performance level decreases the capacity level and decreases the robustness level.

In one embodiment, the parameter settings enable a shock compensation algorithm which increases the robustness level. In one embodiment, the disk drive comprises a disk having a plurality of concentric tracks, and the shock compensation algorithm inhibits writing to every other track on a disk which decreases the capacity level. In another embodiment, before writing to a target track the shock compensation algorithm reads data from adjacent tracks and rewrites the data to the adjacent tracks of a shock is detected, thereby decreasing the performance level.

In yet another embodiment, the parameter settings enable a write verify algorithm which increases the robustness level by performing a read operation of recently written data to verify recoverability.

In still another embodiment, the disk drive comprises a disk having a plurality of concentric tracks, wherein each track comprises a plurality of data sectors. The parameter settings enable a track level parity correction code wherein at least one parity sector is generated over a track and stored on the track to enable recovering a data sector unrecoverable at the sector level, thereby increasing the robustness level and decreasing the performance level.

In still another embodiment, the parameter settings decrease a threshold level of a relocation algorithm for relocating marginal data sectors, thereby increasing the robustness level and decreasing the performance and capacity levels.

In another embodiment, the disk drive comprises a disk having a plurality of concentric tracks, wherein each track comprises a plurality of data sectors and each data sector comprises error correction redundancy symbols of an error correction code (ECC). The parameter settings modify a heroic recovery algorithm for recovering a data sector that is unrecoverable on-the-fly using the ECC.

DESCRIPTION OF THE PREFERRED EMBODIMENTS

Figure 1:
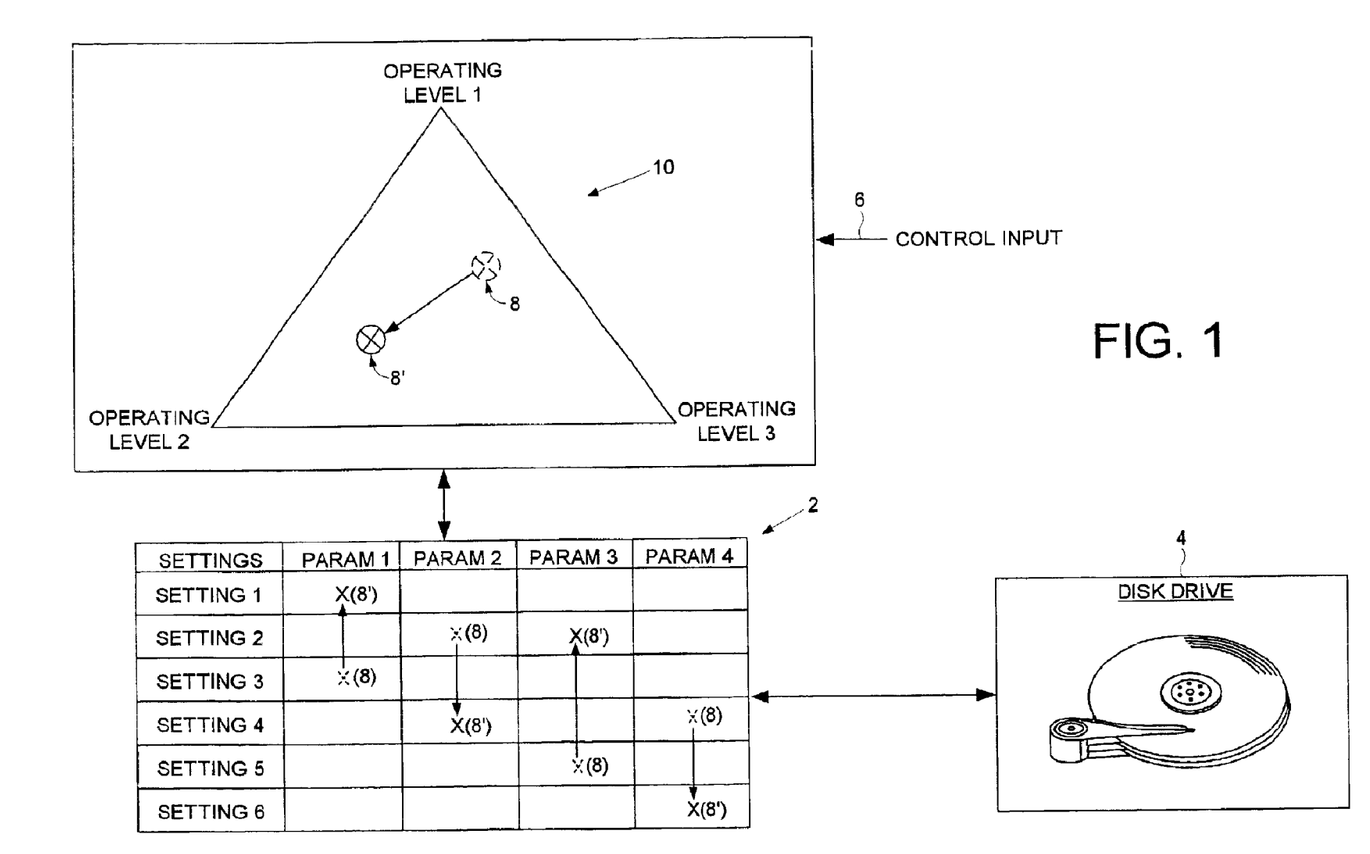
FIG. 1 illustrates a computer program according to an embodiment of the present for adjusting at least three operating levels of a disk drive in a dependent manner in response to control input.

FIG. 1 illustrates a computer program embodied on a computer readable storage medium, the computer program for dependently adjusting a plurality of parameter settings 2 in a disk drive 4. The computer program receives control input 6 for adjusting at least three operating levels of the disk drive 4 in a dependent manner. In response to the control input 6, the computer program adjusts the plurality of parameter settings 2 in a dependent manner.

In the embodiment of FIG. 1, a current value for the plurality of parameter settings 2 is represented by operating condition 8 positioned in a multi-dimensional space 10 representing three operating levels for the disk drive. When the operating condition 8 is adjusted to 8' in response to the control input 6, the operating levels and the plurality of parameter settings 2 are adjusted in a dependent manner. The first and third operating levels decrease while the second operating level increases. Parameter 1 is changed from setting 3 to setting 1, parameter 2 is changed from setting 2 to setting 4, parameter 3 is changed from setting 5 to setting 2, and parameter 4 is changed from setting 4 to setting 6. As described in greater detail below, the parameter settings 2 may affect the operation of a programmable component, such as a preamp, read/write channel, servo controller, etc., or the parameter settings 2 may affect an algorithm implemented by a disk controller, such as shock compensation, write verify, sector relocation, heroic recovery, cache system, etc.

In one embodiment, the computer readable storage medium is embodied in a host computer connected to the disk drive 4. The host computer may include a personal computer, a mobile device, a digital video recorder, or any other similar device utilizing a disk drive for mass storage. In this embodiment, the host computer can configure the disk drive 4 according to the requirements of the specific application. In an alternative embodiment, the disk drive 4 comprises the computer readable storage medium for storing the computer program, thereby enabling the disk drive 4 to automatically adapt to the operating environment in response to the control input 6.

Figure 2:
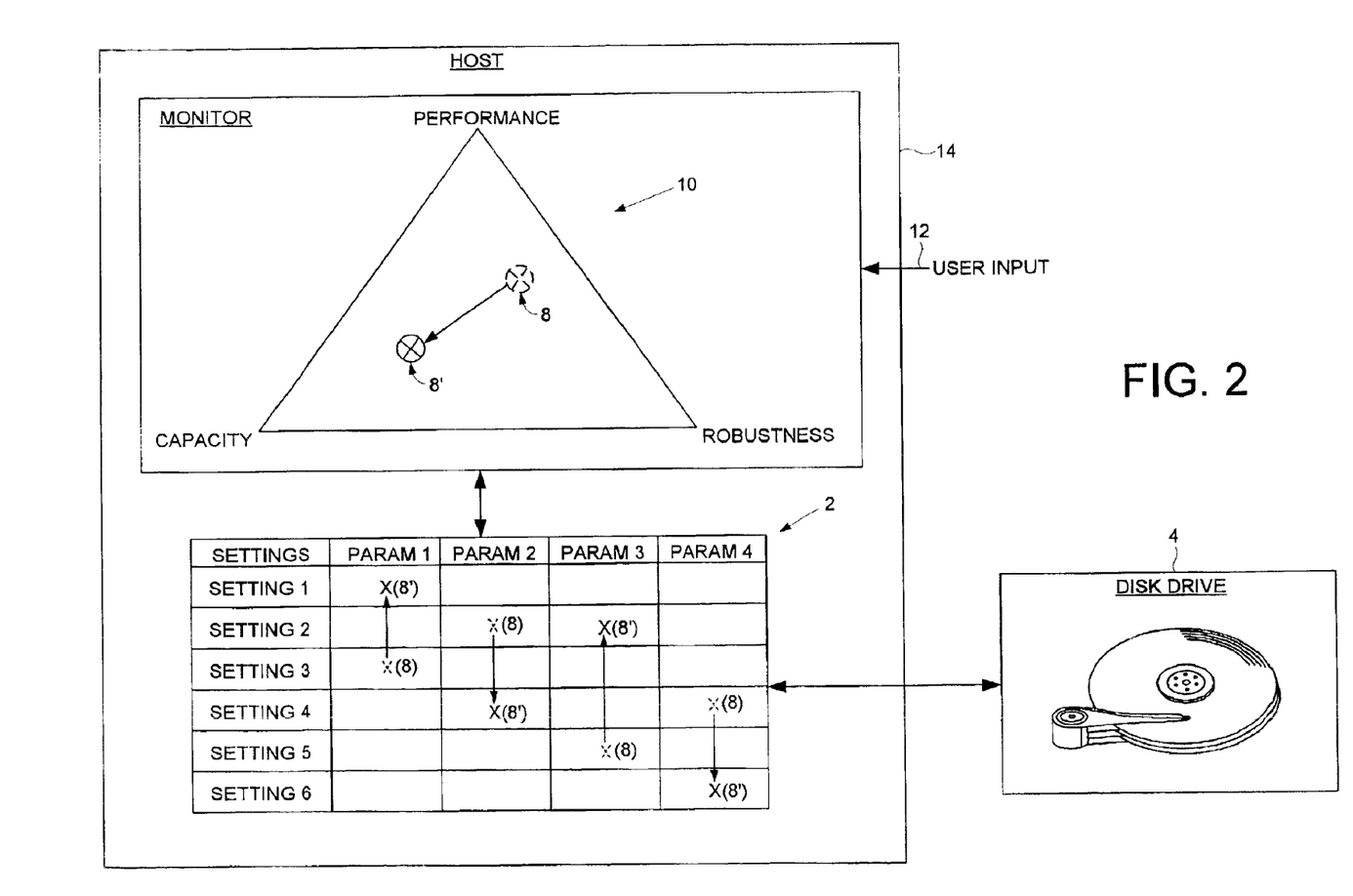
FIG. 2 shows an embodiment of the present invention wherein the control input comprises user input and the at least three operating levels comprise a performance level, a capacity level, and a robustness level.

FIG. 2 shows an embodiment of the present invention wherein the control input 6 of FIG. 1 comprises user input 12 and the computer program for adjusting the plurality of parameter settings 2 is executed by a host computer 14 connected to the disk drive 4. The user input 12 may be generated using any suitable device, such as a keyboard, mouse, roller ball, joy stick, voice transducer, etc. Also in the embodiment of FIG. 2, the computer program comprises code segments for displaying a controller for positioning a slider 8 in a N-dimensional space 10, wherein N is greater than two and the slider 8 location represents N operating levels. When the slider 8 is moved in the N-dimensional space, the N operating levels and the plurality of parameter settings 2 are adjusted in a dependent manner to generate a plurality of modified parameter settings (designated by 8'). In one embodiment, the plurality of modified parameter settings are transmitted to the disk drive 4. In one embodiment, a current plurality of parameter settings are read from the disk drive 4, and the slider 8 is displayed in the multi-dimensional space 10 using the current plurality of parameter settings.

In the embodiment of FIG. 2, the N operating levels dependently adjusted by the slider 8 include a capacity level, a robustness level, and a performance level. Adjusting the slider 8 to increase the capacity level decreases the robustness level and decreases the performance level. Adjusting the slider 8 to increase the robustness level decreases the capacity level and decreases the performance level. Adjusting the slider 8 to increase the performance level decreases the capacity level and decreases the robustness level.

Figure 3:
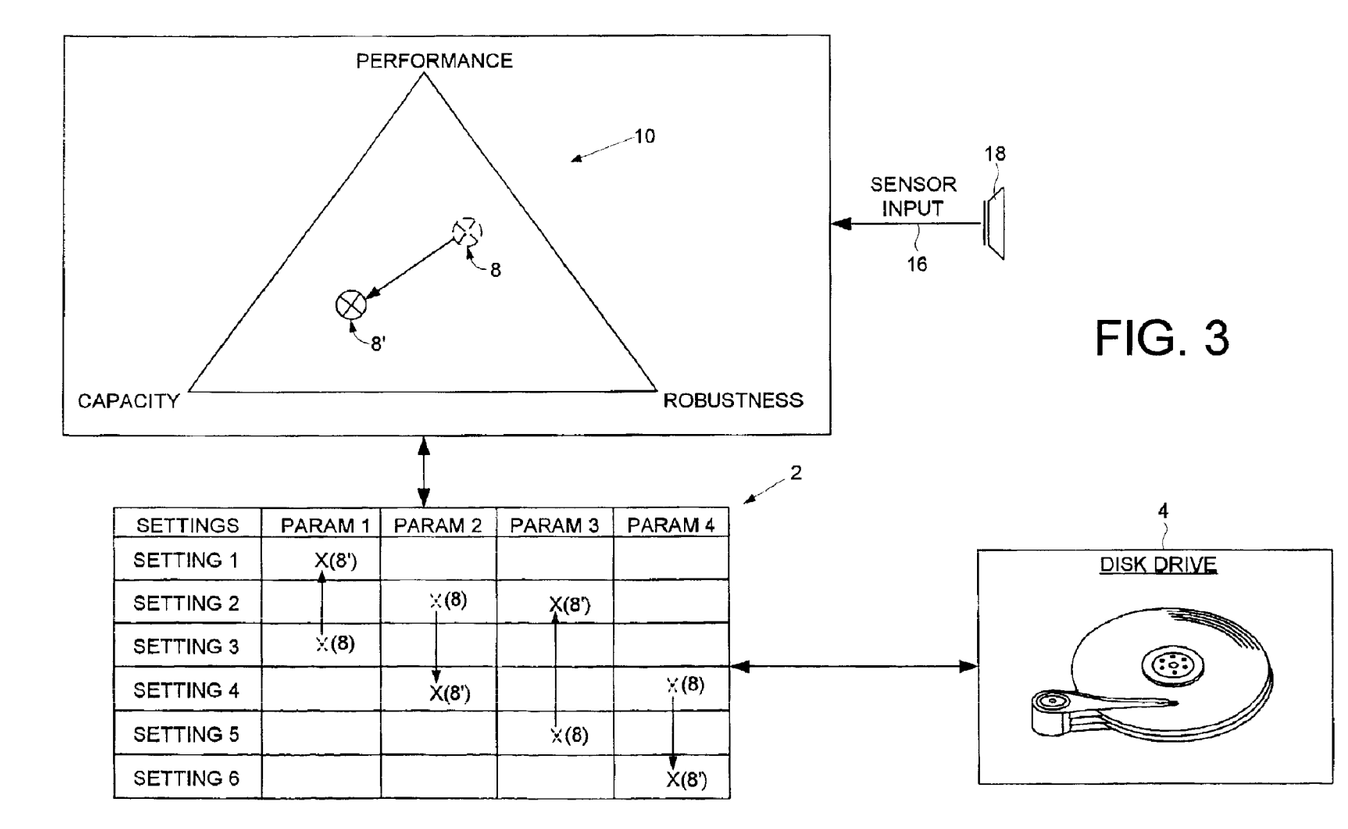
FIG. 3 shows an embodiment of the present invention wherein the control input comprises sensor input generated by an environmental sensor, such as an acoustic or vibration sensor.

FIG. 3 shows an embodiment of the present invention wherein the control input 6 of FIG. 1 comprises sensor input 16 generated by an environmental sensor 18. In one embodiment, the environmental sensor 18 comprises an acoustic sensor for sensing the ambient acoustic level. For example, a digital video recorder may adjust the parameter settings 2 relative to the acoustic level of the operating environment. If the operating environment is quiet, the acoustic noise generated by the disk drive 4 will be noticeable. Therefore, the digital video recorder may adjust the parameter settings 2 affecting the noise output level, such as the seek frequency, seek profile, spindle speed, or other parameters affecting the noise output level. In another embodiment, the environmental sensor 18 comprises a vibration sensor for detecting vibrations that may adversely affect the operation of the disk drive 4. For example, a mobile device may comprise a vibration sensor that senses when the mobile device is being carried by the end user as opposed to mounted in a fixed cradle. While the vibrations affecting the disk drive 4 are large (e.g., when the mobile device is being carried), the mobile device may adjust the parameter settings 2 to increase the robustness level. In one embodiment, the disk drive 4 may comprise the environmental sensor 18 enabling self-adaptation to environmental conditions such as acoustics, vibrations, temperature and/or altitude fluctuations, etc.

Figure 4:
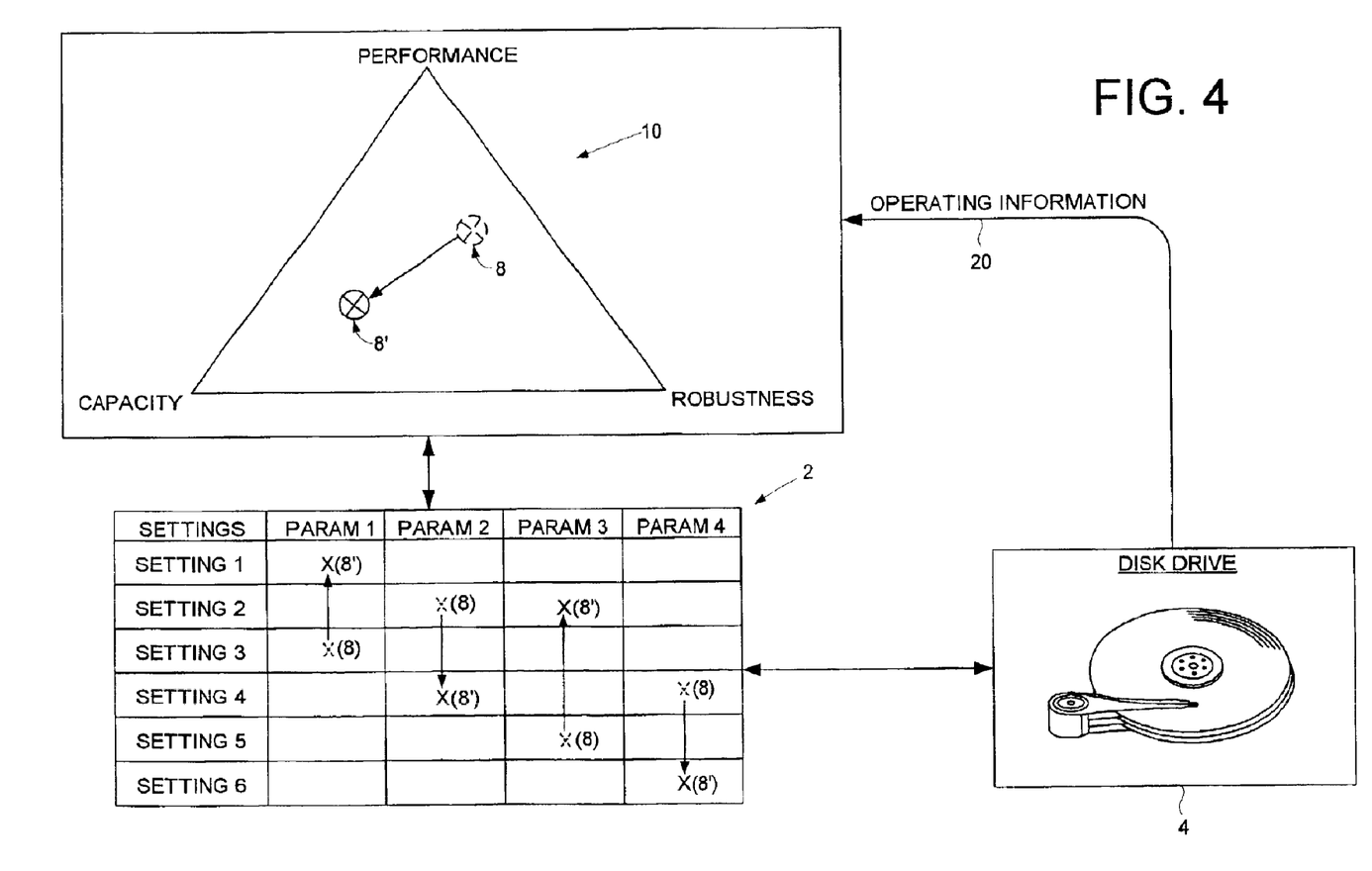
FIG. 4 shows an embodiment of the present invention wherein the control input comprises operating information for the disk drive, such as a work load on the disk drive.

FIG. 4 shows an embodiment of the present invention wherein the control input 6 of FIG. 1 comprises operating information 20 identifying an operating condition of the disk drive 4. The operating information may include disk space allocation (amount of free versus used disk space), bandwidth versus work load, etc. For example, if the amount of free disk space is greater than a predetermined threshold, the parameter settings 2 may be adjusted in order to increase robustness level by decreasing the capacity level. In another embodiment, the parameter settings 2 may be adjusted to accommodate a quality-of-service constraint in a network application. For example, the parameter settings 2 may be adjusted to increase performance as the demand on the disk drive 4 increases in order to satisfy the quality-of-service constraints of the network.

Figure 5:
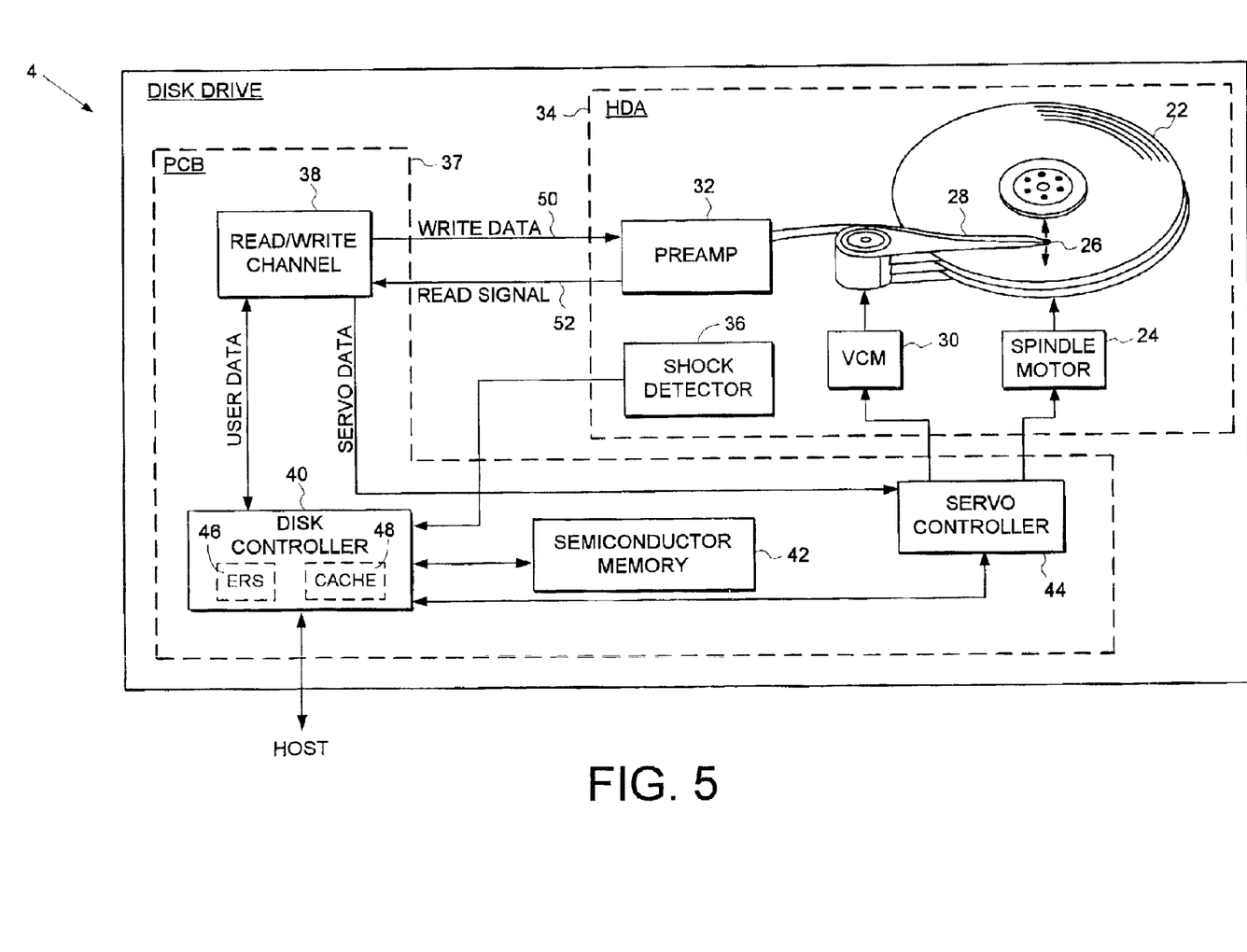
FIG. 5 shows details of a disk drive according to an embodiment of the present invention comprising various programmable components configured using the parameter settings generated by the computer program.

FIG. 5 shows a disk drive 4 according to an embodiment of the present invention comprising various components affected by the parameter settings 2 of FIG. 1. The disk drive 4 comprises a disk 22 rotated about its axis by a spindle motor 24. A head 26 attached to a distal end of an actuator arm 28 is positioned radially over the disk 22 by a voice coil motor (VCM) 30 rotating the actuator arm 28 about a pivot. A preamp 32 generates a write signal applied to the head 26 during write operations and amplifies a read signal emanating from the head 26 during read operations. The preamp 32, VCM 30, spindle motor 24, disk 22, actuator arm 28 and head 26 are enclosed in a head disk assembly (HDA) 34. In the embodiment shown in FIG. 5, the HDA 34 further comprises a shock detector 36 for detecting physical shocks to the HDA 34 that may interfere with the operation of the disk drive 4.

The disk drive 4 further comprises a printed circuit board (PCB) 37 comprising one or more integrated circuits for implementing a read/write channel 38, a disk controller 40, a semiconductor memory 42, and a servo controller 44. During a write operation, the disk controller 40 receives user data from the host to be written to the disk 22. The disk controller 40 comprises an error recovery system (ERS) 46 and cache system 48 for caching the user data in the semiconductor memory 42. The ERS 46 generates error correction redundancy symbols according to an error correction code (ECC), wherein the user data and redundancy symbols are transmitted to the read/write channel 38. The read/write channel 38 performs channel encoding of the user data to generate encoded write data 50 applied to the preamp 32. The preamp 32 uses the write data 50 to modulate the current in the write signal applied to head 26 in order to record a sequence of magnetic transitions onto the disk 22. In one embodiment the disk 22 comprises a plurality of concentric tracks, wherein each track comprises a plurality of data sectors and each data sector comprises user data and error correction redundancy symbols.

During a read operation, the head 26 senses the magnetic transitions recorded on the disk 22 to generate a read signal applied to the preamp 32. The preamp 32 amplifies the read signal generated by the head 26 to generate a read signal 52 applied to the read/write channel 38. The read/write channel 38 comprises suitable circuitry for detecting an estimated data sequence from the read signal 52 which is decoded into estimated user data transmitted to the disk controller 40. The disk controller 40 employs the ERS 46 to detect and correct errors in the estimated user data, and the corrected user data is transmitted to the host.

The disk 22 comprises servo information recorded in embedded servo sectors. During read or write operations, the servo information is read from the embedded servo sectors, and the servo data transmitted to the servo controller 44. The servo controller 44 processes the servo data to generate a control signal applied to the VCM 30 in order to seek the head 26 to the desired track and to maintain proper centerline tracking during read or write operations. The servo controller 44 also generates a control signal applied to the spindle motor 24 to maintain the desired angular velocity for the disk 22.

In one embodiment, the parameter settings 2 enable a shock compensation algorithm implemented by the disk controller 40 which increases the robustness level. The disk controller 40 processes a shock detect signal generated by the shock detector 36. In one embodiment, the parameter settings 2 adjust a sensitivity level of the shock detector 36, wherein an increase in sensitivity increases the robustness level but decreases the performance level. In another embodiment, the disk 22 comprises a plurality of concentric tracks, and the shock compensation algorithm inhibits writing to every other tack on a disk 22 which decreases the capacity level. In another embodiment, before writing to a target track the shock compensation algorithm reads data from adjacent tracks and rewrites the data to the adjacent tracks if a shock is detected, thereby decreasing the performance level.

In yet another embodiment, the parameter settings 2 enable a write verify algorithm implemented by the disk controller 40 which increases the robustness level by performing a read operation of recently written data to verify recoverability. If a write verify fails, the data is rewritten to the errant data sector which may rectify the problem if the write error is transient. If the write verify fails multiple times, indicating a static disk defect error, the errant data sector is relocated to a spare data sector. The latency associated with performing write verify operations decreases the performance whereas detecting bad writes increases robustness and may also enable higher recording densities to increase capacity. In one embodiment, the write verify procedure is executed only if a "high-fly-write" condition is detected wherein the head 26 flies too high above the disk 22 during a write operation. The parameter settings 2 adjust the threshold level at which a high-fly-write condition is detected.

In yet another embodiment, each track recorded on the disk 22 comprises a plurality of data sectors. The parameter settings 2 enable a track level parity correction code wherein at least one parity sector is generated over a track and stored on the track to enable recording a data sector unrecoverable at the sector level. An unrecoverable data sector is essentially regenerated by combining the other data sectors of the track with the parity sector. The track level parity correction code increases robustness while decreasing performance since the parity sector in each track must be updated after every write operation. The additional parity sector recorded in each track also decreases the capacity of the disk 22. In one embodiment, multiple copies of the parity sector are distributed around the circumference of the disk 22 to improve performance, but this further decreases the capacity of the disk 22.

In still another embodiment, the parameter settings 2 decrease a threshold level of a relocation algorithm for relocating marginal data sectors. In one embodiment, the threshold level indicates the number of ECC errors tolerated before a data sector is deemed defective. Reducing the threshold increases robustness by relocating more marginal data sectors but decreases performance due to the overhead in accessing the relocated data sectors. Further, more spare data sectors are needed to accommodate the increase in relocated data sectors which decreases the capacity of the disk 22.

In another embodiment, the parameter settings 2 modify a heroic recovery algorithm for recovering a data sector that is unrecoverable on-the-fly using the ECC. For example, the parameter settings 2 may increase the number of retries performed by the disk drive, as well as the number and extent of parameters adjusted during the heroic recovery procedure, before a data sector is deemed unrecoverable. Increasing the number of retries as well as the number and extent of parameters adjusted improves the chances of recovering a marginal data sector but decreases performance by increasing the recovery latency.

In the embodiment shown in FIG. 2, there are four parameter settings 2 which are adjusted in response to the user moving the slider 8 from an old location to a new location. The new location (represented by slider 8') corresponds to an increase in the capacity level and a decrease in the performance level and the robustness level. The parameter settings 2 affected by the new location of the slider 8' may include changes to data density, shock compensation, write verify, sector relocation, heroic recovery, cache system, or parameter of any other suitable component or algorithm.

Figure 6:
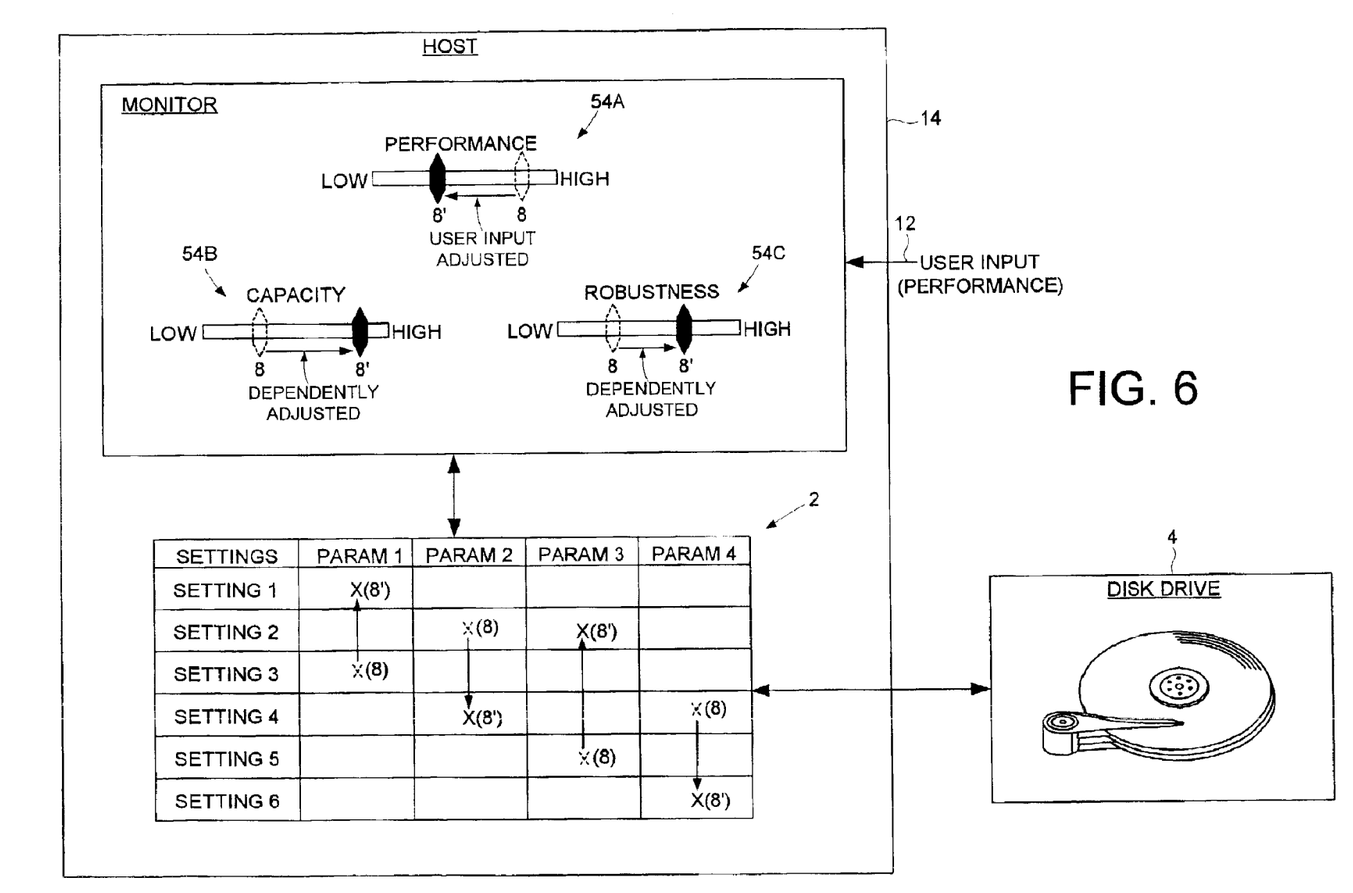
FIG. 6 illustrates a computer program according to an embodiment of the present invention wherein three operating levels of the disk drive are dependently adjusted using three slider controls.

FIG. 6 shows an alternative embodiment of the present invention wherein the performance level, capacity level, and robustness level are adjusted using three separate sliders 54A–54C adjusted by the control input 12. When any one of the sliders 54A–54C is adjusted, the plurality of parameter settings 2 are adjusted to change the corresponding operating levels. For example, if the user adjusts the slider for the performance level controller 54A from 8 to 8' as shown in FIG. 6, the sliders representing the capacity level 54B and robustness level 54C are also adjusted in a dependent manner from 8 to 8'. In response to the control input 12, the parameter settings 2 are adjusted in a dependent manner from 8 to 8', such as the parameter settings affecting the data density, shock compensation, write verify, sector relocation, heroic recovery, cache system, etc.

Figure 7:
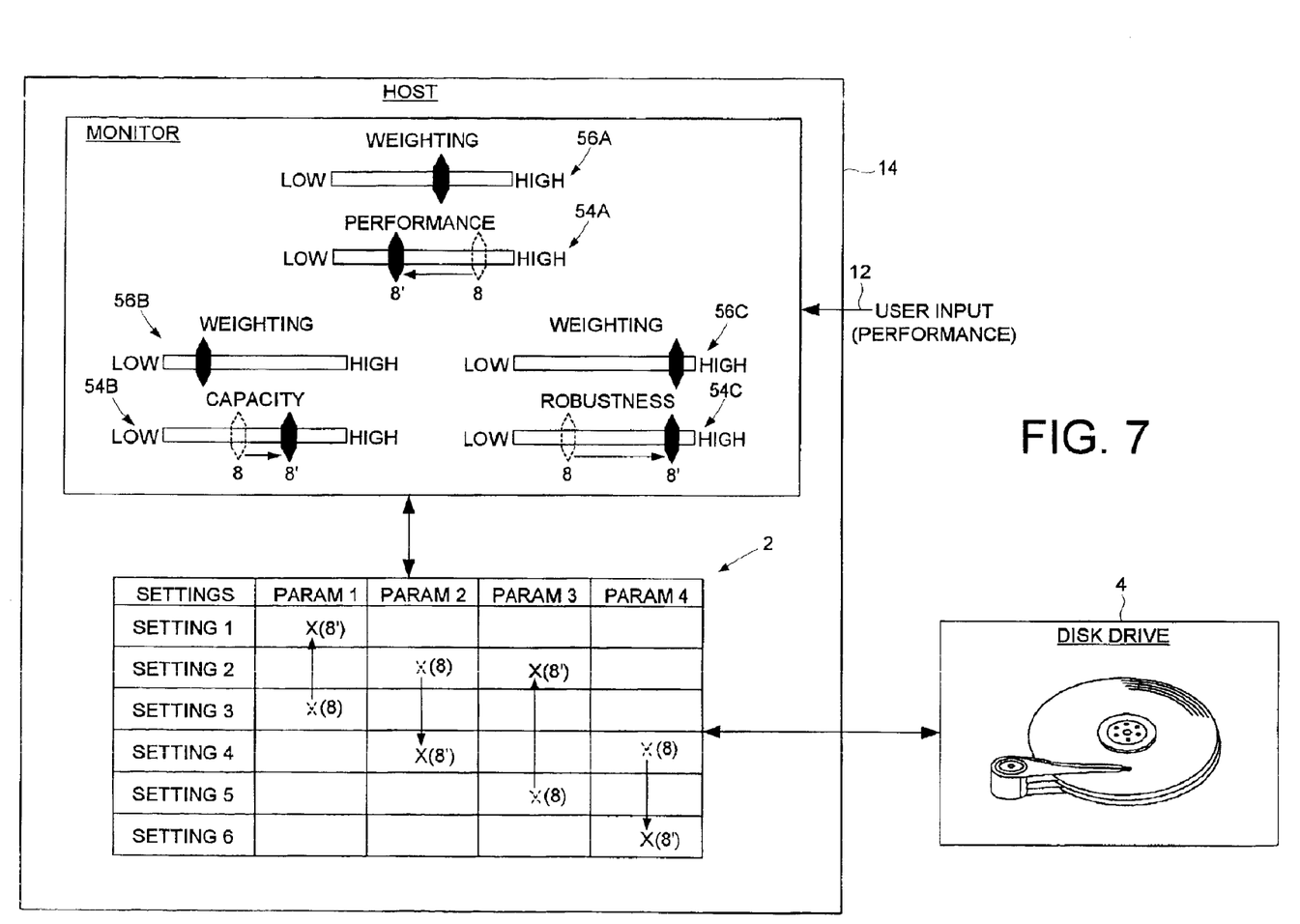
FIG. 7 illustrates a computer program according to an embodiment of the present invention wherein three operating levels of the disk drive are dependently adjusted using three slider controls, wherein each slider control is weighted by the end user based on relative importance.

FIG. 7 shows an embodiment of the present invention wherein the sliders 54A–54C of FIG. 6 are weighted using sliders 56A–56C. This embodiment allows the end user to assign a weight value representing relative importance level to each operating level based on the particular application. In the example of FIG. 7, the end user has assigned a moderate level of importance to the performance level (using weighting slider 56A), a low level of importance to the capacity level (using weighting slider 56B), and a high level of importance to the robustness level (using weighting slider 56C). In this manner when the user input 12 adjusts the slider 54A affecting the performance level, the slider 54B affecting the capacity level is dependently adjusted by an amount less than the dependent adjustment to slider 54C as illustrated in FIG. 7.

The embodiments of the present invention provide a more flexible and intuitive control over the operating characteristics of the disk drive 4. In addition, a higher level of abstraction is provided for the general operating levels of the disk drive, such as the performance level, the capacity level, and the robustness level. The embodiments of the present invention can be extended to adjust multiple operating levels in any suitable multi-dimensional space such as any suitable polygon (square, pentagon, etc.). This abstraction allows the disk drive 4 to be configured without needing a sophisticated technical understanding of the underlying parameter settings adjusted in the disk drive 4.

We claim:

1. A computer program embodied on a computer readable storage medium, the computer program for dependently adjusting a plurality of parameter settings in a disk drive, the computer program comprising code segments for:
   (a) receiving control input for concurrently adjusting at least three operating levels of the disk drive in a dependent manner; and
   (b) in response to the control input, adjusting the plurality of parameter settings in a dependent manner.

2. The computer program as recited in claim 1, wherein the computer readable storage medium is embodied in a host computer connected to the disk drive.

3. The computer program as recited in claim 1, wherein the disk drive comprises the computer readable storage medium for storing the computer program.

4. The computer program as recited in claim 1, wherein the control input comprises user input.

5. The computer program as recited in claim 1, wherein the control input comprises sensor input generated by an environmental sensor.

6. The computer program as recited in claim 5, wherein the environmental sensor comprises an acoustic sensor.

7. The computer program as recited in claim 5, wherein the environmental sensor comprises a vibration sensor.

8. The computer program as recited in claim 1, wherein the control input comprises operating information identifying an operating condition of the disk drive.

9. The computer program as recited in claim 4, further comprising code segments for:
   (a) displaying a controller for positioning a slider in a N-dimensional space, wherein N is greater than two and the slider location represents N operating levels; and
   (b) concurrently adjusting the N operating levels and the plurality of parameter settings in a dependent manner when the slider is moved in the N-dimensional space to generate a plurality of modified parameter settings.

10. The computer program as recited in claim 9, further comprising a code segment for transmitting the plurality of modified parameter settings to the disk drive.

11. The computer program as recited in claim 9, further comprising code segments for:
   (a) reading a current plurality of parameter settings from the disk drive; and
   (b) displaying the slider in the N-dimensional space using the current plurality of parameter settings.

12. The computer program as recited in claim 4, further comprising code segments for:
   (a) displaying N sliders for dependently adjusting N operating levels; and
   (b) concurrently adjusting the N operating levels and the plurality of parameter settings in a dependent manner when any one of the sliders is adjusted to generate a plurality of modified parameter settings.

13. The computer program as recited in claim 12, further comprising code segments for:
   (a) displaying N sliders for weighting the N operating levels, wherein each slider value assigns a weight value representing a relative importance level to each operating level; and
   (b) concurrently adjusting the operating levels and the plurality of parameter settings in a dependent manner relative to the weight values assigned to each operating level when any one of the sliders is adjusted to generate a plurality of modified parameter settings.

14. The computer program as recited in claim 1, wherein the operating levels dependently adjusted by the control input comprise a capacity level, a robustness level, and a performance level.

15. The computer program as recited in claim 14, wherein:
   (a) adjusting the parameter settings to increase the capacity level decreases the robustness level and decreases the performance level;
   (b) adjusting the parameter settings to increase the robustness level decreases the capacity level and decreases the performance level; and (c) adjusting the parameter settings to increase the performance level decreases the capacity level and decreases the robustness level.

16. The computer program as recited in claim 14, wherein the parameter settings enable a shock compensation algorithm which increases the robustness level.

17. The computer program as recited in claim 16, wherein:
   (a) the disk drive comprises a disk having a plurality of concentric tracks; and
   (b) the shock compensation algorithm inhibits writing to every other track on a disk which decreases the capacity level.

18. The computer program as recited in claim 16, wherein:
   (a) the disk drive comprises a disk having a plurality of concentric tracks; and
   (b) before writing to a target track the shock compensation algorithm reads data from adjacent tracks and rewrites the data to the adjacent tracks if a shock is detected, thereby decreasing the performance level.

19. The computer program as recited in claim 14, wherein the parameter settings enable a write verify algorithm which increases the robustness level by performing a read operation of recently written data to verify recoverability.

20. The computer program as recited in claim 14, wherein:
   (a) the disk drive comprises a disk having a plurality of concentric tracks, wherein each track comprises a plurality of data sectors; and
   (b) the parameter settings enable a track level parity correction code wherein at least one parity sector is generated over a track and stored on the track to enable recovering a data sector unrecoverable at the sector level, thereby increasing the robustness level and decreasing the performance level.

21. The computer program as recited in claim 14, wherein:
   (a) the disk drive comprises a disk having a plurality of concentric tracks, wherein each track comprises a plurality of data sectors; and
   (b) the parameter settings decrease a threshold level of a relocation algorithm for relocating marginal data sectors, thereby increasing the robustness level and decreasing the performance and capacity levels.

22. The computer program as recited in claim 14, wherein:
   (a) the disk drive comprises a disk having a plurality of concentric tracks, wherein each track comprises a plurality of data sectors and each data sector comprises error correction redundancy symbols of an error correction code (ECC); and
   (b) the parameter settings modify a heroic recovery algorithm for recovering a data sector that is unrecoverable on-the-fly using the ECC.

* * * * *